United States Patent
Edpalm et al.

(10) Patent No.: US 11,444,884 B2
(45) Date of Patent: Sep. 13, 2022

(54) ENCODING AND TRANSMITTING IMAGE FRAMES OF A VIDEO STREAM

(71) Applicant: Axis AB, Lund (SE)

(72) Inventors: Viktor Edpalm, Lund (SE); Maya Shah, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/082,111

(22) Filed: Oct. 28, 2020

(65) Prior Publication Data

US 2021/0168086 A1 Jun. 3, 2021

(30) Foreign Application Priority Data

Nov. 29, 2019 (EP) ..................................... 19212614

(51) Int. Cl.
| | | |
|---|---|---|
| H04L 12/823 | (2013.01) | |
| H04N 19/172 | (2014.01) | |
| H04L 47/32 | (2022.01) | |

(52) U.S. Cl.
CPC ........... H04L 47/32 (2013.01); H04N 19/172 (2014.11)

(58) Field of Classification Search
None
See application file for complete search history.

(56) References Cited

U.S. PATENT DOCUMENTS

| | | | |
|---|---|---|---|
| 5,726,711 A | 3/1998 | Boyce | |
| 2005/0207499 A1* | 9/2005 | Hwang | H04N 19/176 375/240.16 |
| 2007/0168482 A1* | 7/2007 | Chen | H04L 47/36 709/223 |
| 2007/0177719 A1* | 8/2007 | Dei | H04N 21/631 380/28 |
| 2011/0211629 A1* | 9/2011 | Gustafsson | H04N 19/46 375/224 |

(Continued)

FOREIGN PATENT DOCUMENTS

| | | |
|---|---|---|
| CN | 103873869 A | 6/2014 |
| CN | 106713913 A | 5/2017 |

OTHER PUBLICATIONS

Ali, Ismail Amin et al. "Packet prioritization for H.264/AVC video with cyclic intra-refresh line." J. Vis. Commun. Image Represent. 24, pp. 486-498 (2013).

(Continued)

*Primary Examiner* — Mohammad J Rahman
(74) *Attorney, Agent, or Firm* — Volpe Koenig (57) ABSTRACT

A method for encoding and transmitting a plurality of image frames of a video stream includes: intra refresh encoding the plurality of image frames; encoding one image frame of the plurality of image frames to produce encoded image data of the one image frame, the encoded image data being organized in a plurality of data packets, wherein the encoding comprises intra frame encoding the one image frame; transmitting, over a time period, the intra refresh encoded image frames; transmitting the plurality of data packets, wherein the transmission of the plurality of data packets is distributed over the time period during which the intra refresh encoded image frames are transmitted. An interrelated method for receiving and storing the plurality of image frames, as well as devices and computer program products for performing the methods, are also provided.

16 Claims, 5 Drawing Sheets

(56) References Cited

U.S. PATENT DOCUMENTS

| | | | |
|---|---|---|---|
| 2013/0114715 A1 | 5/2013 | Srinivasan et al. | |
| 2015/0341594 A1* | 11/2015 | Ma | H04N 19/132 |
| | | | 348/14.02 |
| 2016/0219273 A1* | 7/2016 | Pettersson | H04N 19/593 |
| 2016/0307048 A1* | 10/2016 | Krishnamoorthy | G06T 7/70 |
| 2019/0182495 A1* | 6/2019 | Bruns | H04N 19/146 |

OTHER PUBLICATIONS

Ali, Ismail et al. "Enhanced prioritization for video streaming over wireless home networks with IEEE 802.11e" (2011).
Extended European Search Report dated Apr. 15, 2020 for the European Patent Application No. 19212614.2.

\* cited by examiner

ENCODING AND TRANSMITTING IMAGE FRAMES OF A VIDEO STREAM

TECHNICAL FIELD

The present invention relates to methods and devices for encoding, transmitting, and storing image frames of a video stream. In particular, it relates to such methods and devices where the encoding involves intra refresh encoding.

BACKGROUND

A common problem with H.264 encoding (and similar standards) is the intra frame (I-frame) bitrate spike. This problem is often worse for monitoring cameras due to the large numbers of cameras that may be connected and used together in a network and due to the typical monitoring camera scene having a very large (×10-×100) I-frame vs prediction frame (P-frame) size ratio. Ideally, from a network point of view, a constant bitrate would be preferable. One solution to reduce the bitrate spike for a camera is to spread the I-frame over a plurality of image frames and instead have a part (intra refresh region) of each image frame forced to be encoded as I-blocks. The intra refresh region is moved across the image frame over a set of image frames, thereby "refreshing" the image. This method is called periodic intra refresh or just intra refresh. Intra refresh encoding techniques provide options for handling of bitrate spikes when encoding and transmitting a video stream. However, intra refresh encoding may instead lack support for playback of a stored intra refresh encoded video stream. The lack of support arises from playback needing to start from a full I-frame. A conventional intra refresh encoded video stream by design lacks, or only contains a few of, such I-frames. Thus, the stored intra refresh encoded video stream must be played from the beginning, or a long duration of time or a large number of frames may lapse before the playback eventually can start. For this reason, videos are often stored in chunks of a fixed time/number of frames so that each chunk will contain an I-frame, at the beginning of it. However, such chunks are not flexible and provide only limited options for where to start playback from. There is thus room for improvement within this context.

SUMMARY

Providing methods, devices, and software for low bit rate intra refresh encoding that enables or improves the possibility of playback of stored video streams, thus at least mitigating some of the issues in the prior art.

According to a first aspect, there is provided a method for encoding and transmitting a plurality of image frames of a video stream. The method comprises intra refresh encoding the plurality of image frames. The method further comprises encoding one image frame of the plurality of image frames to produce encoded image data of the one image frame, the encoded image data being organized in a plurality of data packets. The encoding comprises intra frame encoding the one image frame. The method further comprises transmitting, over a time period, the intra refresh encoded image frames. The method further comprises transmitting the plurality of data packets. The transmission of the plurality of data packets is distributed over the time period during which the intra refresh encoded image frames are transmitted.

The term data packet may generally be understood as a transfer unit containing or enclosing the actual information (i.e. encoded image data) that is transmitted. The data packet typically comprises a header and a payload section. Data packet can also be referred to as a datagram.

Traffic shaping can be advantageously employed for solving the problem of playback of stored intra refresh encoded video stream. By including an intra frame encoded image frame at regular intervals in the transmitted encoded data, playback starting from these frames is made possible. By delaying the transmission of some of the data packets comprising the intra frame encoded image frame, such that the transmission of the plurality of data packets is distributed over the time period during which the intra refresh encoded image frames are transmitted, an efficient distribution of the relatively bitrate heavy I-frame across a longer duration is provided. Thus, bitrate spikes in the video stream may be removed or at least mitigated. Yet, the one image frame may be recreated at the receiving end of the transmission by combining recently received data packets so that it may act as an I-frame when decoding and displaying the video stream. Playback may be started from at least any intra frame encoded image frame, e.g. recreated !-frames. Thus, playback of a stored video stream may commence from a larger number of image frames in the video stream while keeping the bitrate reasonably low and spike free. By also transmitting the intra refresh encoded version of all image frames in the video stream, normal streaming playback (i.e. a stream constantly received by and presented to an end-user while being delivered by a provider) is facilitated.

According to embodiments of the first aspect, the intra refresh encoded image frames and the plurality of data packets are transmitted within a same bitstream. At least some of the data packets may be embedded between two intra refresh encoded image frames in the bitstream.

In such a manner, decoding may be made simpler as a decoder will not need to access two different bitstreams for decoding.

According to embodiments of the first aspect the bitstream is organized into network abstraction layer, NAL, units. The plurality of data packets may be associated with a same NAL unit type, the NAL unit type being unspecified or user defined in a used video coding standard.

An advantage with such embodiments is that otherwise unused or superfluous NAL unit types may be used for the data packets. This allows for a standard decoder to decode the received intra refresh encoded stream for streaming playback and disregard the plurality of data packets comprising the I-frame.

According to embodiments of the first aspect the intra refresh encoded image frames and the plurality of data packets are transmitted in at least two separate bitstreams.

In such a manner, encoding may be made simpler and less complex.

According to embodiments of the first aspect the step of encoding the one image frame of the plurality of image frames into the plurality of data packets comprises dividing image data of the one image frame into a plurality of image data pieces. The step of encoding further comprises separately encoding each of the plurality of image data pieces into one or more data packets. The encoding of each of the plurality of image data pieces comprises intra frame encoding each image data piece. The intra frame encoding of the plurality of image data pieces is distributed over the time period during which the intra refresh encoded image frames are transmitted.

The term image data piece may be understood as any subdivision of an image frame or any subdivision of image data pertaining to the image frame. For example, an image data piece may comprise one or more encoding units (e.g.

macroblock, coding tree unit, etc.) of the image frame. In one embodiment, an image data piece comprises a slice or a tile of the image frame.

As with the advantage of distributing of transmission resource requirements (i.e. bitrate) over the time period, such embodiments may enable distributing the encoding resource requirements over the same time period. This may be particularly relevant for e.g. low general performance devices or low power devices. The same may be true for decoding, i.e. that decoding resource requirements may be distributed over the time period.

According to embodiments of the first aspect the step of encoding the one image frame of the plurality of image frames into the plurality of data packets comprises, collectively, intra frame encoding all image data of the one image frame. The step of encoding further comprises dividing the intra frame encoded image data into the plurality of data packets for distributed transmission over the time period during which the intra refresh encoded image frames are transmitted.

As such, simpler and generally more reliable intra frame encoding may be achieved. By first encoding the one image frame, the dividing step may advantageously be adapted according to the known bitrate requirements of the encoded one image frame. Thus, an even more stable bitrate may be achieved for the transmission of the encoded video stream.

According to embodiments of the first aspect a resulting bit size of each data packet of the plurality of data packets is substantially the same for the plurality of data packets.

In relation with that which was mentioned previously as advantageous effects of embodiments, such feature is beneficial due to the resulting more stable bitrate achieved for the transmission of the encoded video stream.

According to embodiments of the first aspect at least one of the data packets comprises metadata indicating a chronological position of the one image frame among the plurality of image frames.

The term metadata may be understood as data pertaining to e.g. a point in time or a frame number of the one image frame within the video stream.

Such embodiments may be beneficial in aiding a decoder or other types of devices on the receiving end of the transmission to know which of the image frames of the video stream that the I-frame corresponds to. In particular, such metadata may aid in inserting the one image frame at a correct chronological position among the received intra refresh encoded image frames in the received video stream.

According to a second aspect there is provided a device configured for encoding and transmitting a plurality of image frames of a video stream. The device comprises an encoder, comprising circuitry adapted to intra refresh encode the plurality of image frames and encode one image frame of the plurality of image frames into a plurality of data packets. The encoding comprises intra frame encoding the one image frame. The device further comprises a transmitter, comprising circuitry adapted to transmit, over a time period, the intra refresh encoded image frames and transmit the plurality of data packets. The transmission of the plurality of data packets is distributed over the time period during which the intra refresh encoded image frames are transmitted.

Such a device generally provides similar advantages as the first aspect, whose methods it is adapted to perform.

According to a third aspect there is provided a method for storing an encoded video stream, the method comprises. receiving, during a time period, a plurality of intra refresh encoded image frames. The method further comprises receiving, distributed over the time period, a plurality of data packets, comprising an intra frame encoded image frame, the intra frame encoded image frame corresponding to one image frame of the plurality of intra refresh encoded image frames. The method further comprises replacing the corresponding intra refresh encoded image frame among the plurality of intra refresh encoded image frames with the intra frame encoded image frame to form an encoded video stream. The method further comprises storing the encoded video stream.

Such a method may be advantageous for use at a decoder or a receiving end of the transmission discussed in relation to the first aspect. In general, the method provides similar advantages to those of the first aspect. The method is beneficial for receiving and storing of a video stream encoded and transmitted according to the first aspect. By recreating an intra frame encoded image frame from recently received data packets and replacing the corresponding intra refresh encoded image frame among the plurality of intra refresh encoded image frames with the intra frame encoded image frame, playback of a stored video stream may commence from at least any intra frame encoded image frame in the stored video stream.

According to embodiments of the third aspect the plurality of intra refresh encoded image frames and the plurality data packets are received within a same bitstream, or the plurality of intra refresh encoded image frames and the plurality data packets are received in two separate bitstreams.

Such embodiments provide similar advantages as embodiments of the first aspect with corresponding features, already provided in the above.

According to embodiments of the third aspect at least one data packet of the plurality of data packets comprises metadata indicating a chronological position of the one image frame among the plurality of image frames, wherein the metadata is used to indicate which of the intra refresh encoded images that corresponds to the intra frame encoded image frame.

Such embodiments provide similar advantages as embodiments of the first aspect with corresponding features, already provided in the above.

According to embodiments of the third aspect the plurality of data packets is associated with a same NAL unit type, wherein the NAL unit type is used to identify the plurality of data packets in a stream of received data packets, the NAL unit type being unspecified or user defined in a used video coding standard.

Such embodiments provide similar advantages as embodiments of the first aspect with corresponding features, already provided in the above.

According to a fourth aspect there is provided a device configured for storing an encoded video stream. The device comprises a receiver, comprising circuitry adapted to receive, during a time period, a plurality of intra refresh encoded image frames and receive, distributed over the time period, a plurality of data packets, comprising an intra frame encoded image frame, the intra frame encoded image frame corresponding to one of the plurality of intra refresh encoded image frames. The device further comprises a processing unit, comprising circuitry adapted to replace the corresponding intra refresh encoded image frame among the plurality of intra refresh encoded image frames with the intra frame encoded image frame to form an encoded video stream and a storage medium adapted to store the encoded video stream.

Such a device generally provides similar advantages as the third aspect, whose methods it is adapted to perform. By extension, the device may also provide similar advantages to the first and second aspect due to their interconnected relationship.

According to a fifth aspect there is provided a computer program product comprising a computer-readable storage medium with instructions adapted to carry out the method according to the first or third aspects when executed by a device having processing capability.

Such a computer program product generally provides similar advantages as the other aspects, whose methods it is adapted to carry out.

A further scope of applicability will become apparent from the detailed description given below. However, it should be understood that the detailed description and specific examples, while indicating preferred embodiments, are given by way of illustration only, since various changes and modifications will become apparent to those skilled in the art from this detailed description.

Hence, it is to be understood that the embodiments are not limited to the particular component parts of the device described or acts of the methods described as such device and method may vary. It is also to be understood that the terminology used herein is for purpose of describing particular embodiments only, and it is not intended to be limiting. It must be noted that, as used in the specification and the appended claims, the articles "a," "an," "the," and "said" are intended to mean that there are one or more of the elements unless the context clearly dictates otherwise. Thus, for example, reference to "a device" or "the device" may include several devices, and the like. Furthermore, the words "comprising", "including", "containing" and similar wordings does not exclude other elements or steps.

BRIEF DESCRIPTION OF THE DRAWINGS

The above and other aspects will, in the following, be described in more detail with reference to appended figures. The figures should not be considered limiting; instead they should be considered for explaining and understanding purposes.

As illustrated in the figures, the sizes of layers and regions may be exaggerated for illustrative purposes and, thus, are provided to illustrate the general structures. Like reference numerals refer to like elements throughout.

DETAILED DESCRIPTION

The present embodiments will now be described more fully hereinafter with reference to the accompanying drawings, in which currently preferred embodiments are shown. This teaching may, however, be embodied in many different forms and should not be construed as limited to the embodiments set forth herein; rather, these embodiments are provided for thoroughness and completeness, and to fully convey the scope of the embodiments to the skilled person.

Figure 1:
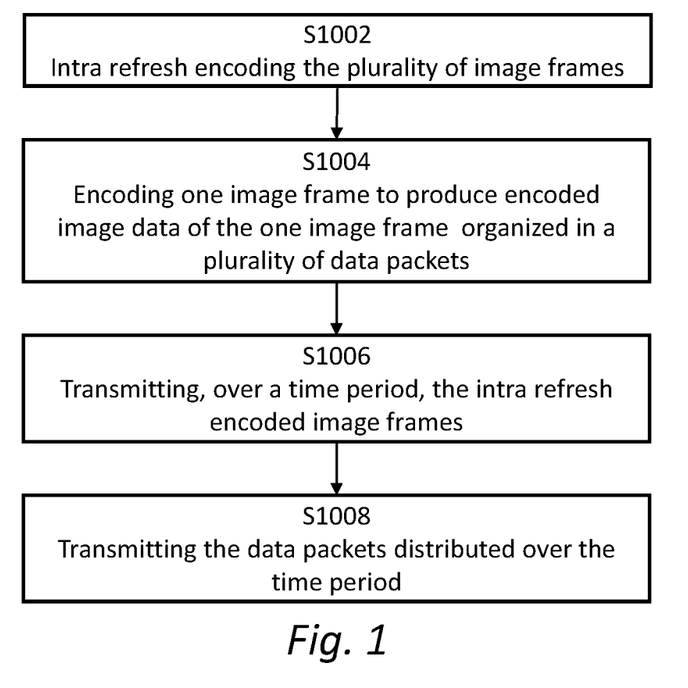
FIG. 1 shows a flowchart of a method of encoding and transmitting the video stream.
Figure 2:
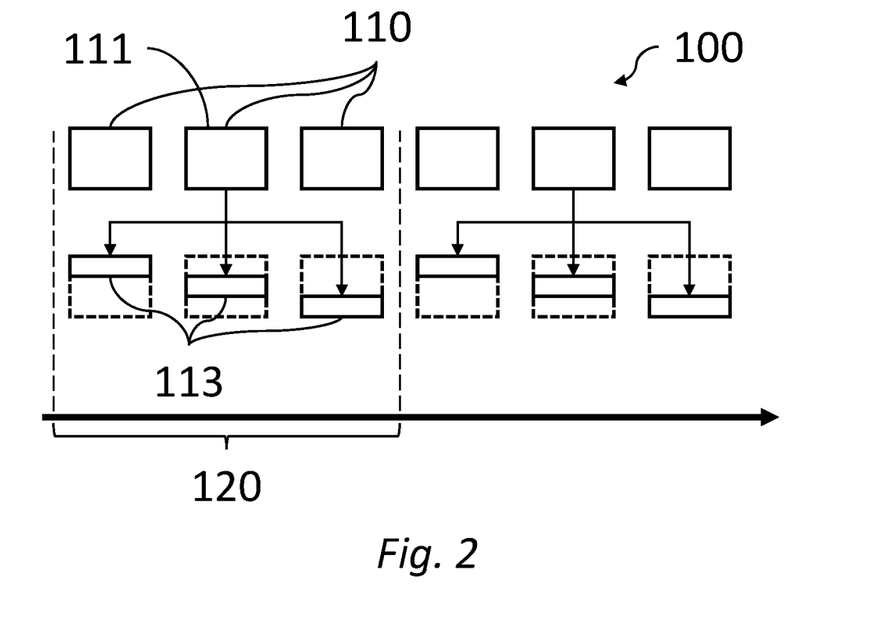
FIG. 2 schematically shows image frames and data packets of a video stream along a time axis.

The flowchart of FIG. 1 provides the steps of a method for encoding and transmitting a plurality of image frames 110 of a video stream 100. The method comprises intra refresh encoding S1002 the plurality of image frames 110. The method further comprises encoding S1004 one image frame 111 of the plurality of image frames 110 to produce encoded image data of the one image frame 111, the encoded image data being organized in a plurality of data packets 113. The encoding comprises intra frame encoding the one image frame 111. The method further comprises transmitting S1006, over a time period 120, the intra refresh encoded image frames. The method further comprises transmitting S1008 the plurality of data packets 113. The transmission of the plurality of data packets 113 is distributed over the time period 120 during which the intra refresh encoded image frames are transmitted S1006. FIG. 2 essentially provides a graph of image frames 110 in a video stream 100 being organized chronologically along a time axis. The figure also provides an example of how the one image frame 111 may be encoded S1004 to produce encoded image data of the one image frame 111, the encoded image data being organized in a plurality of data packets 113.

Encoding and transmission may be performed continuously and directly as soon as a received input video stream 100 is received. This may entail encoding S1002, S1004 and transmitting S1006, S1008 without any intermediate storing of the image frames 110 of the video stream 100.

The steps of intra refresh encoding S1002, the plurality of image frames 110 and encoding S1004 the one image frame 111 may be performed sequentially or concurrently. In a sequential implementation, the encoding S1004 of the one image frame 111 may be performed in between intra refresh encoding S1002 one of the plurality of image frames 110 and intra refresh encoding S1002 another one of the plurality of image frames 110. As described below in conjunction with FIG. 4, other ways of performing the encoding steps S1002 and S1004 are equally possible. The raw video stream is thus encoded twice with one output being a full intra refresh encoded video stream and the other output being encoded image data of the one image frame 111, the encoded image data being organized in a plurality of data packets 113.

The encoded image data of the one image frame 111 is in the example of FIG. 2 organized into data packets 113 that correspond to three equally sized horizontally extending rectangles. A large number of opportunities are available for organizing the encoded image data. Examples include rectangles/rows (as shown in FIG. 2), columns, blocks, tiles, squares, slices, chunks, and other arbitrary geometric shapes.

Patterns such as e.g. a chessboard pattern, or other intermittent patterns, may also be used for organizing the encoded image data. Essentially any arbitrary pattern may be used for organizing the encoded image data. Macroblocks, known from many video coding practices, may also form the basis for organization of encoded image data. Organization of encoded image data may also be based on color content. In more extreme examples, the organization may also be performed based on just a few pixels, or even single pixels, of the one image frames 111.

Organization of encoded image data may also be performed as to achieve a resulting bit size of each data packet 113 of the plurality of data packets 113 that is substantially the same for the plurality of data packets 113. The data packets 113 may alternatively be organized such that they correspond to substantially equal portions of the image frame 110.

The intra refresh encoded image frames and the plurality of data packets 113 may be transmitted S1006, S1008 in at least two separate bitstreams. In FIG. 2, the top row may be understood as a first bitstream and the bottom row, comprising the data packets 113, may be understood as a separate, second bitstream.

Figure 3:
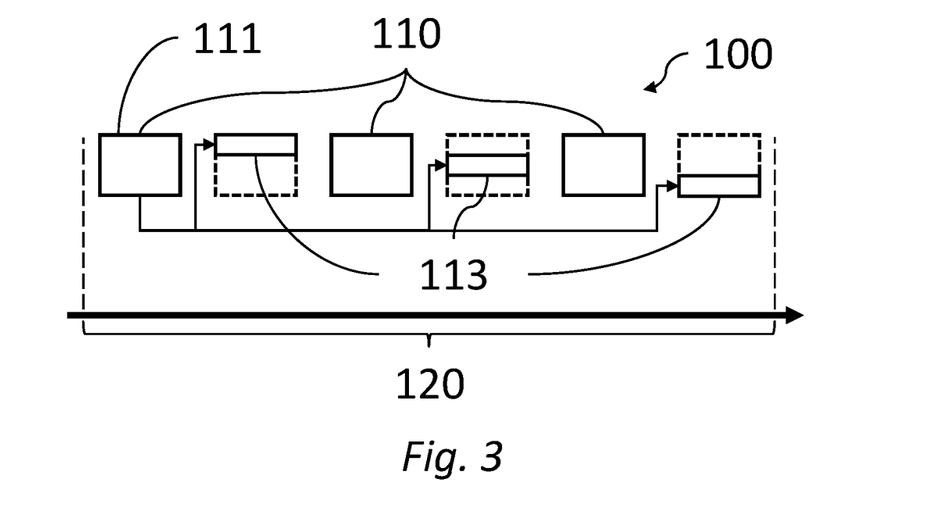
FIG. 3 schematically shows image frames and data packets, embedded between image frames, of a video stream along a time axis.

FIG. 3 shows how intra refresh encoded image frames and the plurality of data packets 113 may be transmitted S1006, S1008 within a same bitstream. Also visible in FIG. 3, at least some of the data packets 113 are embedded between two intra refresh encoded image frames in the bitstream. The bitstream may start with a data packet 113 or with an intra refresh encoded image frame.

The intra refresh encoding involves a periodic intra refresh pattern which is a cyclic pattern which defines which region/portion/macroblock(s) of an image frame that should be forced to be intra encoded, i.e. encoded as I-blocks. The pattern is periodic/cyclic which means that for every n image frame, the pattern starts over, wherein n is an integer and wherein n>0.

The video stream 100 may comprise a plurality of groups of pictures (GOP) corresponding to the periodicity of the intra refresh pattern. A GOP may be understood as a series of subsequent image frames 110. One GOP may correspond to the time period 120. In one embodiment, one image frame per GOP is intra frame encoded. In other embodiments, the one image frame per every other (or every third, etc.) GOP is intra frame encoded. The periodicity of the intra frame encoding may in some embodiments not be based on the GOP size, but based on other measures such as available bitrate or a level of motion in the video stream, etc.

When encoded, bitstreams may be organized into network abstraction layer, NAL, units. The plurality of data packets 113 may be associated with a same NAL unit type, the NAL unit type being unspecified or user defined in a used video coding standard. This may be understood as the data packets 113 being hidden under NAL units of the bitstream. Examples of video coding standards include the H.264/Advanced Video Coding (AVC) and High Efficiency Video Coding (HEVC) standards.

At least one of the data packets 113 may comprise metadata indicating a chronological position of the one image frame 111 among the plurality of images 110.

The metadata may comprise data pertaining to e.g. a point in time, a frame number, a GOP number, a frame number within a GOP, etc. A frame number may be understood as indicating the chronological position of the image frame, since the start of the video stream, relative to other image frames, and a GOP number may be understood as indicating the chronological position of the GOP, since the start of the video stream, relative to other GOPs. The frame number within a GOP may be understood as indicating the chronological position of the image frame, since the start of the GOP, relative to other image frames within the same GOP. Essentially, metadata may comprise any data for tracking the chronological position of the intra frame encoded one image frame.

Figure 4:
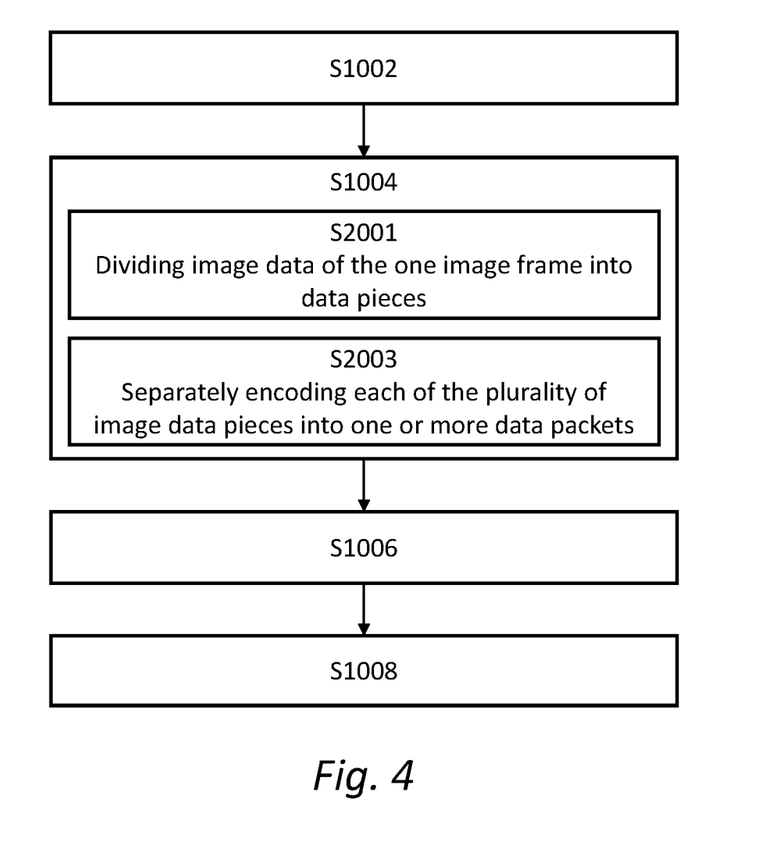
FIG. 4 shows a flowchart of a method of encoding and transmitting the video stream.

FIG. 4 provides that the step of encoding S1004 the one image frame 111 of the plurality of image frames 110 into the plurality of data packets 113 may comprise dividing S2001 image data of the one image frame 111 into a plurality of image data pieces (e.g. slices). The step of encoding S1004 may further comprise separately encoding S2003 each of the plurality of image data pieces into one or more data packets 113. The encoding of each of the plurality of image data pieces comprises intra frame encoding each image data piece. The intra frame encoding of the plurality of image data pieces may be distributed over the time period 120 during which the intra refresh encoded image frames are transmitted.

Figure 5:
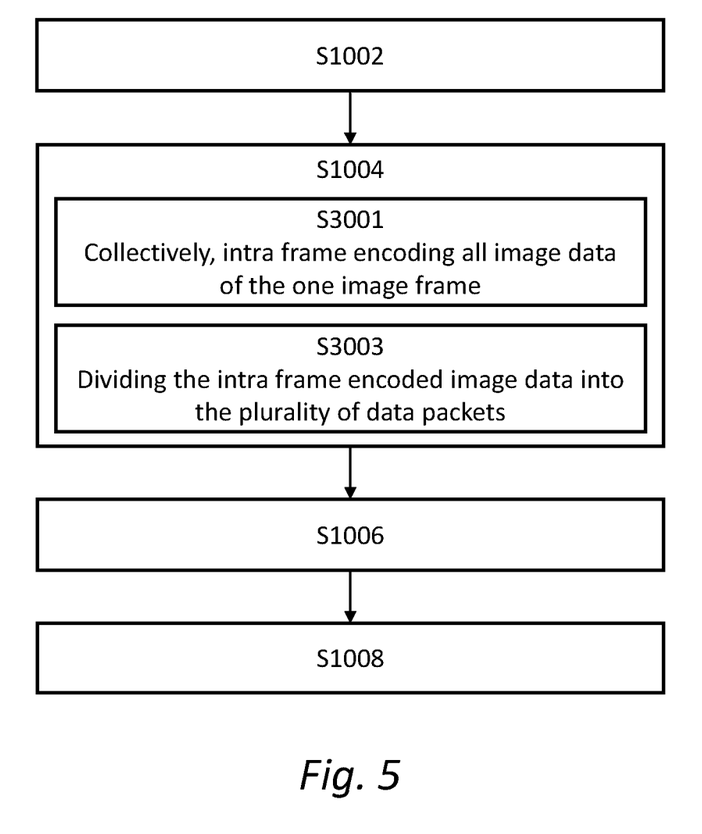
FIG. 5 shows a flowchart of a method of encoding and transmitting the video stream.

FIG. 5 provides that the step of encoding S1004 the one image frame 111 of the plurality of image frames 110 into the plurality of data packets 113 may comprise collectively, intra frame encoding S3001 all image data of the one image frame 111. The step of encoding S1004 may further comprise dividing S3003 the intra frame encoded image data into the plurality of data packets 113 for distributed transmission over the time period 120 during which the intra refresh encoded image frames are transmitted.

Figure 6:
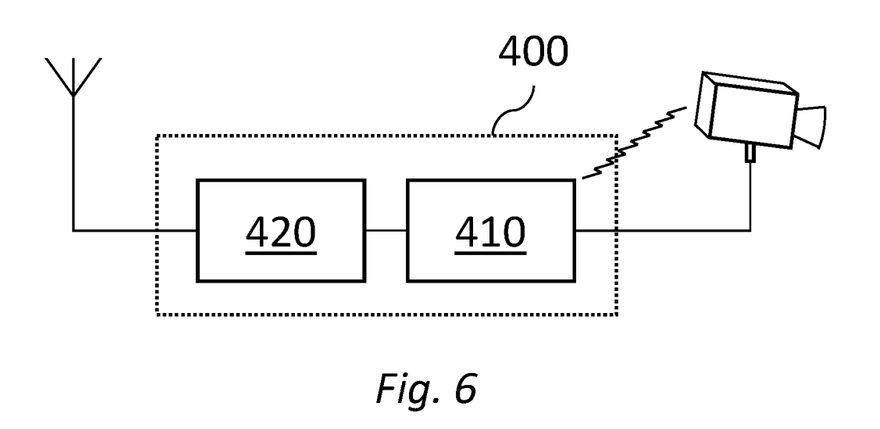
FIG. 6 schematically shows a device for encoding and transmitting the video stream.

FIG. 6 provides a schematic of a device 400 configured for encoding and transmitting a plurality of image frames 110 of a video stream 100. The device 400 comprises an encoder 410, comprising circuitry adapted to intra refresh encode S1002 the plurality of image frames, and encode S1004 one image frame 111 of the plurality of image frames 110 into a plurality of data packets 113. The encoding comprises intra frame encoding the one image frame 111. The device 400 further comprises a transmitter 420, comprising circuitry adapted to transmit S1006, over a time period 120, the intra refresh encoded image frames, and transmit S1008 the plurality of data packets 113. The transmission of the plurality of data packets 113 is distributed over the time period 120 during which the intra refresh encoded image frames are transmitted.

The encoder 410 and the transmitter 420 may be integrally arranged with each other. The encoder 410 and the transmitter 420 may be separate from each other and communicatively connected. The transmitter 420 may be adapted for transmitting the video stream 100 using a conductive connection or a wireless connection. In FIG. 6, the transmitter is shown to connect with an antenna for wireless transmission. The transmitter 420 may be configured to transmit the video stream to a receiver 610 of a device 600, described below.

The device 400 or the encoder 410 may be connected to a video capture device, as shown in FIG. 6, via a conductive connection or a wireless connection. The video capture device may be a video camera. The video capture device may be the source of the video stream 100, by capturing it while monitoring a scene. The video capture device may be a monitoring camera. The video camera may be a network connected monitoring camera. Alternatively, the source of the video stream 100 may be another source than a video capturing device such as a memory e.g. storing the raw data of the video stream.

Figure 7:
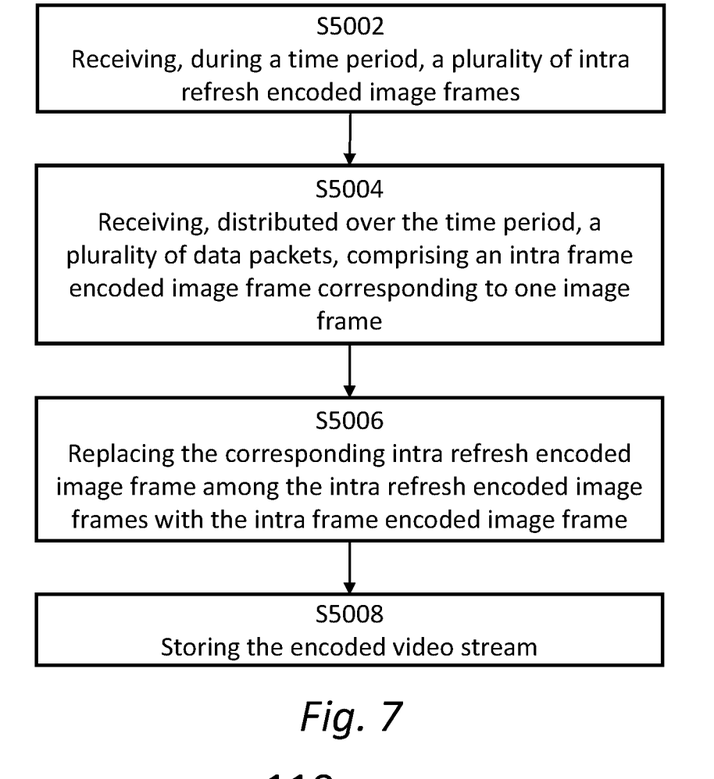
FIG. 7 shows a flowchart of a method of receiving and storing the video stream

The flowchart of FIG. 7 provides the steps of a method for storing an encoded video stream 100. The method comprises receiving S5002, during a time period 120, a plurality of intra refresh encoded image frames. The method further comprises receiving S5004, distributed over the time period 120, a plurality of data packets 113, comprising an intra frame encoded image frame, the intra frame encoded image frame corresponding to one image frame 111 of the plurality of intra refresh encoded image frames. The method further comprises replacing S5006 the corresponding intra refresh encoded image frame among the plurality of intra refresh encoded image frames with the intra frame encoded image frame to form an encoded video stream 100. The method further comprises storing S5008 the encoded video stream 100.

Figure 8:
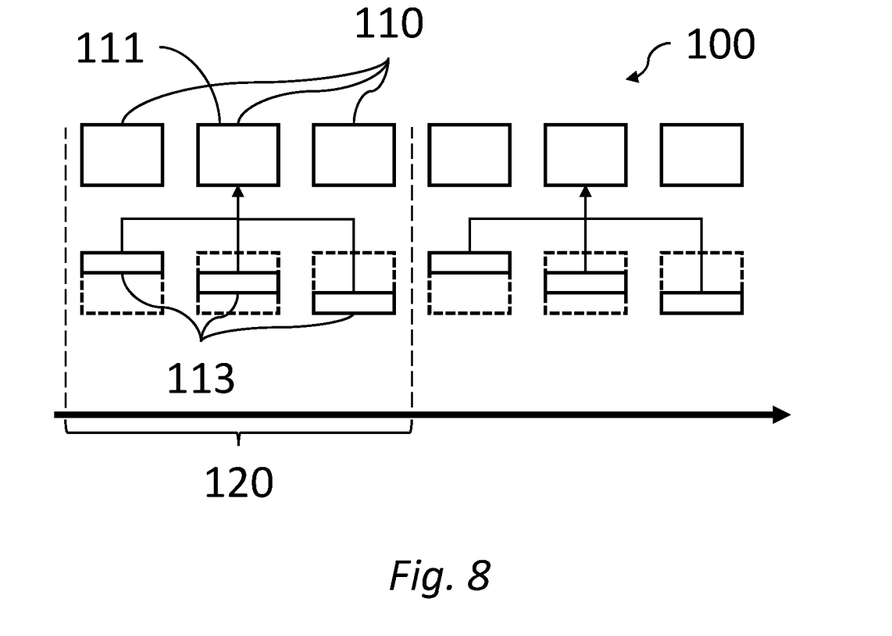
FIG. 8 schematically shows image frames and data packets of a video stream along a time axis.

FIG. 8 essentially provides a graph of image frames 110 in a video stream 100 being organized chronologically along a time axis in a similar fashion to that which is shown in FIG. 2. However, FIG. 8 differs in the directions of the arrows between the one image frame 111 and the corresponding data packets 113. While FIG. 2 shows organizing the encoded image data of the one image frame 111 into a plurality of data packets, FIG. 8 essentially shows the opposite, i.e. replacing S5006 a corresponding intra refresh encoded image frame with a recombined or recreated, intra frame encoded, one image frame 111.

Figure 9:
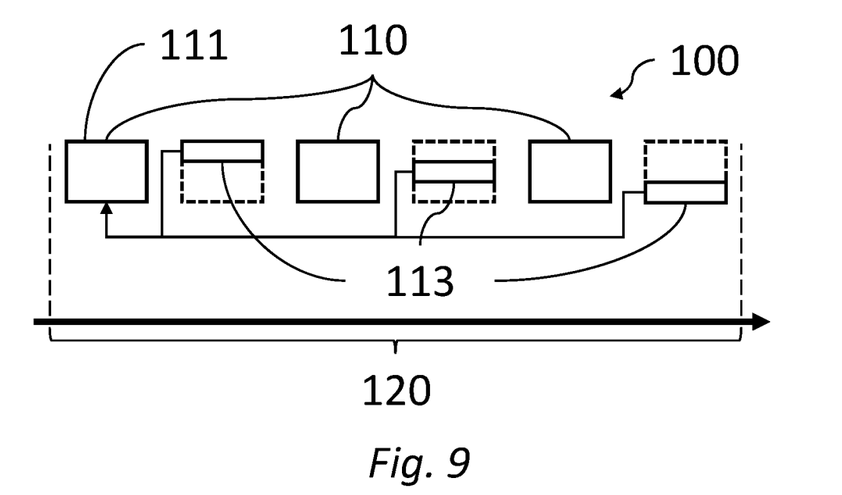
FIG. 9 schematically shows image frames and data packets, embedded between image frames, of a video stream along a time axis.

The plurality of intra refresh encoded image frames and the plurality data packets 113 may be received S5002, S5004 in two separate bitstreams. The plurality of intra refresh encoded image frames and the plurality data packets 113 may be received S5002, S5004 within a same bitstream. Comparably to FIG. 3, FIG. 9 shows how intra refresh encoded image frames and the plurality of data packets 113 may be received S5002, S5004 within a same bitstream. Also visible in FIG. 9, at least some of the data packets 113 are embedded between two intra refresh encoded image frames in the bitstream. However, compared to FIG. 3, FIG. 9 shows reversed arrow directions. This relates the same topic discussed in the above, regarding FIGS. 2 and 8.

At least one data packet 113 of the plurality of data packets 113 may comprise metadata indicating a chronological position of the one image frame 111 among the plurality of image frames 110, wherein the metadata is used to indicate which of the intra refresh encoded images that corresponds to the intra frame encoded image frame. The chronological position may indicate, or correspond to, an intra refresh encoded image frame that should be replaced with the recreated I-frame.

The plurality of data packets 113 may be associated with a same NAL unit type, wherein the NAL unit type is used to identify the plurality of data packets 113 in a stream of received data packets 113, the NAL unit type being unspecified or user defined in a used video coding standard, further described in the above. As also mentioned in the above, NAL unit types, used in such a fashion, allows for a standard decoder to decode the received intra refresh encoded video stream 100 for streaming playback and disregard the plurality of data packets 113 comprising the I-frame.

Figure 10:
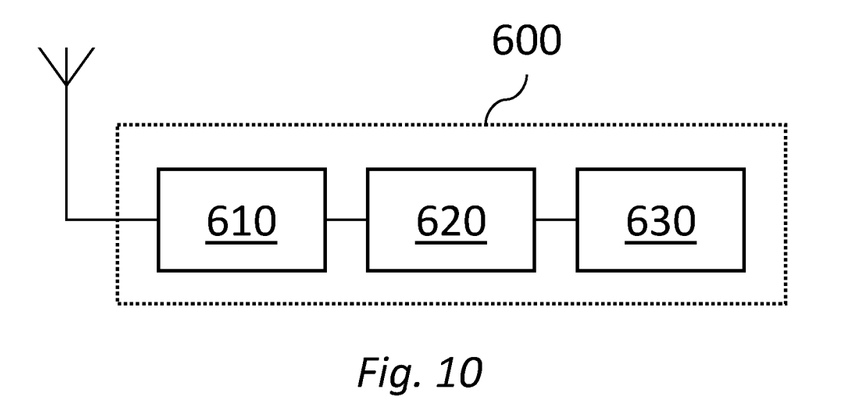
FIG. 10 schematically shows a device for receiving and storing the video stream.

FIG. 10 provides a schematic of a device 600 configured for storing an encoded video stream 100. Note that the device 600 and the device 400 should be considered different entities. The device 600 comprises a receiver 610, comprising circuitry adapted to receive S5002, during a time period, a plurality of intra refresh encoded image frames and receive S5004, distributed over the time period, a plurality of data packets 113, comprising an intra frame encoded image frame. The intra frame encoded image frame corresponding to one of the plurality of intra refresh encoded image frames, The device 600 further comprises a processing unit 620, comprising circuitry adapted to replace S5006 the corresponding intra refresh encoded image frame among the plurality of intra refresh encoded image frames with the intra frame encoded image frame to form an encoded video stream 100.

The device 600 further comprises a storage medium 630 adapted to store S5008 the encoded video stream.

The receiver 610 may be adapted for receiving the video stream 100 using a conductive connection or a wireless connection. In FIG. 10, it is shown to connect with an antenna for wireless transmission. The receiver 610 may be configured to receive the video stream from the transmitter 420 of the device 400. Examples of wireless communication methods may include wireless local area network (WLAN), Bluetooth, 3G/4G/5G mobile data communication. Other radio/electromagnetic wave-based communication methods may be employed.

The processing unit 620 may be a computer or a device with computing or processing capability. The processing unit 620 may be a decoder.

The storage medium 630 may be a volatile or non-volatile storage medium. Examples of non-volatile storage mediums include disk-based storage mediums such as hard disk drives (HDD), read only memory (ROM) devices, solid state drives (SSD), flash memory devices, etc. Examples of volatile storage mediums include random access memory (RAM). Non-volatile storage mediums generally provide enhanced large scale, long term storage while volatile storage mediums generally provide high speed, quick access storage.

Subunits of the device 600, i.e. the receiver 610, the processing unit 620, and the storage medium 630 may be integrally arranged with each other or separate from each other and communicatively connected.

The methods described herein may be implemented by a device having computing or processing capability. For this, a computer program product is provided, comprising a computer-readable storage medium with instructions adapted to carry out the methods when executed by a device having processing capability.

Additionally, variations to the disclosed embodiments can be understood and effected by the skilled person in practicing the claims, from a study of the drawings, the disclosure, and the appended claims.

The invention claimed is:

1. A method for encoding and transmitting a plurality of image frames of a video stream, the method comprising:
    encoding the plurality of image frames using a periodic intra refresh encoding technique to produce intra refresh encoded image frames, used by a decoder to playback the plurality of image frames;
    intra frame encoding one image frame of the plurality of image frames to produce intra frame encoded image data of the one image frame, used by the decoder to start playback of the plurality of image frames, wherein the intra frame encoded image data replaces a corresponding frame in the intra refresh encoded image frames;
    organizing the intra frame encoded image data in a plurality of data packets;
    transmitting, during a first period of time, the intra refresh encoded image frames; and
    transmitting the plurality of data packets, wherein at least some of the data packets are delayed such that the transmission of the plurality of data packets is distributed over the first period of time.

2. The method according to claim 1, wherein the intra refresh encoded image frames and the plurality of data packets are transmitted within a same bitstream, wherein at least some of the data packets are embedded between two intra refresh encoded image frames in the bitstream.

3. The method according to claim 2, wherein the bitstream is organized into network abstraction layer, NAL, units, wherein the plurality of data packets are associated with a same NAL unit type, the NAL unit type being unspecified or user defined in a used video coding standard.

4. The method according to claim 1, wherein the intra refresh encoded image frames and the plurality of data packets are transmitted in at least two separate bitstreams.

5. The method according to claim 1, wherein the step of encoding the one image frame of the plurality of image frames into the plurality of data packets comprises:
dividing image data of the one image frame into a plurality of image data pieces; and
separately intra encoding each of the plurality of image data pieces into one or more data packets, wherein the intra encoding of the plurality of image data pieces is performed distributed over the first period of time.

6. The method according to claim 1, wherein the step of intra frame encoding the one image frame of the plurality of image frames and the step of organizing the intra frame encoded image data into the plurality of data packets comprises:
collectively, intra frame encoding all image data of the one image frame; and
dividing the intra frame encoded image data into the plurality of data packets for distributed transmission over the time period during which the intra refresh encoded image frames are transmitted.

7. The method according to claim 1, wherein a resulting bit size of each data packet of the plurality of data packets is the same for the plurality of data packets.

8. The method according to claim 1, wherein at least one of the data packets comprises metadata indicating a chronological position of the one image frame among the plurality of image frames.

9. A device configured for encoding and transmitting a plurality of image frames of a video stream, the device comprising:
an encoder, comprising circuitry adapted to:
encode the plurality of image frames using a periodic intra refresh encoding technique to produce intra refresh encoded image frames, used by a decoder to playback the plurality of image frames, and
intra frame encode one image frame of the plurality of image frames into a plurality of data packets, used by the decoder to start playback of the plurality of image frames, wherein the intra frame encoded one image frame replaces a corresponding frame in the intra refresh encoded image frames, and
a transmitter, comprising circuitry adapted to:
transmit, during a first period of time, the intra refresh encoded image frames, and
transmit the plurality of data packets, wherein at least some of the data packets are delayed such that the transmission of the plurality of data packets is distributed over the first period of time.

10. A method for storing an encoded video stream, the method comprising:
receiving, during a first period of time, a plurality of encoded image frames being encoded using a periodic intra refresh encoding technique,
receiving, distributed over the first period of time, a plurality of data packets, comprising an intra frame encoded image frame, the intra frame encoded image frame corresponding to one image frame of the plurality of encoded image frames,
replacing the corresponding one image frame of the plurality of encoded image frames with the intra frame encoded image frame to form an encoded video stream, and
storing the encoded video stream.

11. The method according to claim 10, wherein the plurality of encoded image frames and the plurality data packets are received within a same bitstream, or wherein the plurality of encoded image frames and the plurality data packets are received in two separate bitstreams.

12. The method according to claim 10, wherein at least one data packet of the plurality of data packets comprises metadata indicating a chronological position of the one image frame among the plurality of encoded image frames, wherein the metadata is used to indicate which of the plurality of encoded images that corresponds to the intra frame encoded image frame.

13. The method according to claim 10, wherein each of the plurality of data packets is associated with a same NAL unit type, wherein the NAL unit type is used to identify the plurality of data packets in a stream of received data packets, the NAL unit type being unspecified or user defined in a used video coding standard.

14. A device configured for storing an encoded video stream, comprising:
a receiver comprising circuitry adapted to:
receive, during a first period of time, a plurality of encoded image frames being encoded using a periodic intra refresh encoding technique, and
receive, distributed over the first period of time, a plurality of data packets, comprising an intra frame encoded image frame, the intra frame encoded image frame corresponding to one image frame of the plurality of encoded image frames,
a processing unit, comprising circuitry adapted to replace the corresponding one image frame of the plurality of encoded image frames with the intra frame encoded image frame to form an encoded video stream, and
a storage medium adapted to store the encoded video stream.

15. A non-transitory computer-readable storage medium with instructions adapted to carry out a method for encoding and transmitting a plurality of image frames of a video stream when executed by a device having processing capability, the method comprising:
encoding the plurality of image frames using a periodic intra refresh encoding technique to produce intra refresh encoded image frames, used by a decoder to playback the plurality of image frames;
intra frame encoding one image frame of the plurality of image frames to produce intra frame encoded image data of the one image frame, used by the decoder to start playback of the plurality of image frames, wherein the intra frame encoded image data replaces a corresponding frame in the intra refresh encoded image frames;
organizing the encoded image data in a plurality of data packets;
transmitting, during a first period of time, the intra refresh encoded image frames; and
transmitting the plurality of data packets, wherein at least some of the data packets are delayed such that the transmission of the plurality of data packets is distributed over the first period of time.

16. A non-transitory computer-readable storage medium with instructions adapted to carry out a method for storing an encoded video stream when executed by a device having processing capability, the method comprising:
  receiving, during a first period of time, a plurality of encoded image frames being encoded using a periodic intra refresh encoding technique,
  receiving, distributed over the first period of time, a plurality of data packets, comprising an intra frame encoded image frame, the intra frame encoded image frame corresponding to one image frame of the plurality of encoded image frames,
  replacing the corresponding one image frame of the plurality of encoded image frames with the intra frame encoded image frame to form an encoded video stream, and
  storing the encoded video stream.

* * * * *